(12) United States Patent
Schneider et al.

(10) Patent No.: US 12,180,060 B2
(45) Date of Patent: Dec. 31, 2024

(54) VALVE SHAFT LOCKING MECHANISM

(71) Applicant: PROTECHNA S.A., Fribourg (CH)

(72) Inventors: Sebastian Schneider, Oberelbert (DE); Ernst Obermann, Eichen (DE)

(73) Assignee: PROTECHNA S.A., Fribourg (CH)

( * ) Notice: Subject to any disclaimer, the term of this patent is extended or adjusted under 35 U.S.C. 154(b) by 139 days.

(21) Appl. No.: 17/618,671

(22) PCT Filed: Jul. 3, 2020

(86) PCT No.: PCT/EP2020/068852
§ 371 (c)(1),
(2) Date: Dec. 13, 2021

(87) PCT Pub. No.: WO2021/004951
PCT Pub. Date: Jan. 14, 2021

(65) Prior Publication Data
US 2022/0242720 A1 Aug. 4, 2022

(30) Foreign Application Priority Data

Jul. 9, 2019 (DE) .......................... 102019118534.3

(51) Int. Cl.
*F16K 1/20* (2006.01)
*B67D 3/04* (2006.01)
*F16K 27/02* (2006.01)

(52) U.S. Cl.
CPC ............ *B67D 3/047* (2013.01); *F16K 1/2028* (2013.01); *F16K 1/2078* (2013.01); *F16K 27/0227* (2013.01)

(58) Field of Classification Search
CPC ............... B67D 3/047; Y10T 137/0508; Y10T 137/0525; F16K 5/0242; F16K 5/0442;
(Continued)

(56) References Cited

U.S. PATENT DOCUMENTS 3,727,879 A 4/1973 Lange et al.
3,783,900 A * 1/1974 Waldbillig .......... F16K 11/0853
251/309

(Continued)

FOREIGN PATENT DOCUMENTS

CL 201801834 A1 10/2018
CN 101171447 A 4/2008
(Continued)

OTHER PUBLICATIONS

Canadian Office Action corresponding to application No. EP2020068852, mailed Feb. 17, 2023.
(Continued)

*Primary Examiner* — Hailey K. Do
(74) *Attorney, Agent, or Firm* — Quarles & Brady, LLP

(57) ABSTRACT

A tapping armature for liquid containers, in particular for being connected to the outlet port or the outlet opening of a transport and storage container for liquids, the tapping armature comprising an armature housing in which a valve body pivotable by means of a valve shaft and serving to open and close a flow cross section of an outlet tube is disposed, a connection end of the valve shaft for being connected to the valve body being disposed in the outlet tube of the armature housing and an operating end of the valve shaft protruding from the armature housing through a housing dome formed on the armature housing. A form-fitting engagement is established between the housing dome and a valve shaft portion housed in the housing dome in order to axially secure the valve shaft in the armature housing.

8 Claims, 4 Drawing Sheets

(58) Field of Classification Search
CPC .... F16K 5/0647; F16K 1/2268; F16K 1/2078; F16K 1/2028; F16K 1/224; F16K 1/2035; F16K 1/225; F16K 41/063; F16K 41/066; F16K 41/083; F16K 41/086; F16K 41/14
See application file for complete search history.

(56) References Cited

U.S. PATENT DOCUMENTS

| | | | | |
|---|---|---|---|---|
| 4,890,817 | A * | 1/1990 | Uri | F16K 27/065 251/312 |
| 5,031,876 | A * | 7/1991 | Giacomini | F16K 5/0694 251/312 |
| 6,321,948 | B1 | 11/2001 | Bellon et al. | |
| 8,356,795 | B2 * | 1/2013 | Schade | F16K 1/225 251/305 |
| 11,541,223 | B2 * | 1/2023 | Hopf | F16K 11/085 |
| 2022/0242720 | A1 | 8/2022 | Schneider et al. | |

FOREIGN PATENT DOCUMENTS

| | | | |
|---|---|---|---|
| CN | 107061782 B | 1/2019 | |
| DE | 4443287 A1 | 6/1996 | |
| DE | 102006020447 A1 | 11/2007 | |
| DE | 102015002173 A1 | 8/2016 | |
| DE | 102016200206 A1 | 7/2017 | |
| DE | 102018102062 A1 | 8/2019 | |
| EP | 0331805 A1 | 9/1989 | |
| FR | 2820187 A1 * | 8/2002 | F16K 27/067 |
| GB | 803438 A | 10/1958 | |
| JP | S5054619 U | 5/1975 | |
| JP | H07269740 A | 10/1995 | |
| JP | 2004075198 A | 3/2004 | |
| RU | 2685852 C1 | 4/2019 | |
| WO | 2005054728 A1 | 6/2005 | |
| WO | 2021004951 A1 | 1/2021 | |

OTHER PUBLICATIONS

Chilean Office Action issued Feb. 17, 2023.
Translation of International Preliminary Report on Patentability issued in corresponding PCT Application No. PCT/EP2020/068852, mailed Jan. 20, 2022.
International Search Report and Written Opinion in corresponding PCT Application No. PCT/EP2020/068852, mailed Sep. 25, 2020.
Australian Office Action, for corresponding application No. 2020312153, mailed Oct. 31, 2023.
Japanese Office Action issued Feb. 1, 2023.
Canadian Office Action for corresponding Application No. 3,142,612, mailed Mar. 6, 2024, 3 pages.
Japanese Offica Action for corresponding Japanese Application No. 2021-575273, issued Aug. 21, 2024. (English Translation.).
Brazilian Office Action issued in corresponding Application No. BR112022000057-0, mailed Apr. 18, 2024. (English Translation).
Argentinian Office Action, for corresponding application No. 20200101925, mailed Dec. 26, 2023.
Ukrainian Office Action for corresponding Application No. a 202200401, mailed Apr. 29, 2024, 1 page. (English translation).
Indonesian Office Action for corresponding Application No. P00202200970, mailed Mar. 6, 2024, 4 pages.
United Arab Emirates Ministry of Economy Search Report for corresponding Application No. P6000037/2022, mailed Oct. 10, 2024. (Englishe translation).

* cited by examiner

VALVE SHAFT LOCKING MECHANISM

This application represents the national stage entry of PCT International Application No. PCT/EP2020/068852 filed on Jul. 3, 2020, which application claims priority to German Application No. DE 10 2019 118 534.3 filed Jul. 9, 2019, the entire contents of which are incorporated herein by reference for all purposes.

The present disclosure relates to a tapping armature for liquid containers, in particular for being connected to the outlet port or the outlet opening of a transport and storage container for liquids, the tapping armature comprising an armature housing in which a valve body pivotable by means of a valve shaft and serving to open and close a flow cross section of an outlet tube is disposed, a connection end of the valve shaft for being connected to the valve body being disposed in the outlet tube of the armature housing and an operating end of the valve shaft protruding from the armature housing through a housing dome formed on the armature housing.

DE 10 2018 102 062 A1 discloses a tapping armature of the kind mentioned above in which the valve shaft is axially secured in the armature housing between the housing dome and the valve shaft portion housed in the housing dome by a force-fitting connection between the valve shaft portion and the housing dome achieved by a suitable fit between the diameter of the valve shaft portion and the inner diameter of the housing dome.

Hence, in order to install the valve shaft in the housing dome of the armature housing, the valve shaft portion of the valve shaft has to be pressed into the bore of the housing dome so as to ensure that an axial fixation of the valve shaft in the armature housing is made possible by sufficient frictional locking between the valve shaft portion and the housing dome. The pressing force required for installation, which posits a corresponding pulling force for removing the valve shaft, has to be great enough to preclude unintentional removal of the valve shaft from the armature housing during operation of the tapping armature. Thus, the pressing force is greater than would actually be necessary for installing the valve shaft.

Hence, the object of the disclosure is to propose a tapping armature comprising a valve shaft whose installation requires little installation force without adversely affecting a secure axial fixation of the valve shaft in the armature housing.

To attain said object, the tapping armature according to the disclosure has the features of claim 1.

According to the disclosure, a form-fitting engagement is established between the housing dome and a valve shaft portion housed in the housing dome in order to axially secure the valve shaft in the armature housing.

By axially securing the valve shaft via a form fit between the valve shaft and the housing dome, the installation force required for installing the valve shaft merely has to be great enough for the form fit to be established, the valve shaft being axially secured via the established form fit irrespective of the installation force.

Particularly preferably, an engagement means having a radial dome projection formed in a passage opening of the housing dome, which serves for the passage of the valve shaft portion, is realized for establishing the form-fitting engagement, the radial dome projection forming an axial locking mechanism together with a radial valve shaft projection of the valve shaft portion. Owing to this preferred embodiment, the armature housing, which is typically produced by injection molding, can be produced without having to change the mold used for the injection molding process. Instead, the armature housing having the housing dome which is formed on the armature housing and whose production necessitates the use of a mold core defining the receiving bore for receiving the valve shaft can be produced by just slightly modifying the mold core used thus far without having to change the mold itself or even needing a new mold.

If the dome projection is formed at the axially lower end of the passage opening in the housing dome, axial fixation is realized in the area of transition between the outlet tube and the housing dome and thus at a particularly stiff point of the armature housing.

Preferably, the dome projection is ramp-shaped and has a relatively short locking ramp steeply rising in the installation direction of the valve shaft and a relatively long and flat latching ramp descending in the installation direction of the valve shaft, which means that the locking ramp and the latching ramp are easy to produce in an injection molding process for producing the armature housing using a forcibly demolded core. Additionally, the locking ramp forms an obstacle relatively easy to overcome during installation of the valve shaft, and the latching ramp forms a ramp rising in the removal direction and hindering the valve shaft from being removed unless a relatively great pulling force is applied.

It is particularly advantageous if, in combination with the advantageous configuration of the dome projection described above, the valve shaft projection is also ramp-shaped and has a locking ramp descending in the installation direction and a locking shoulder formed at the end of the ramp since the inverse design of the locking ramps of the dome projection and of the valve shaft projection allows the locking ramps to slide on each other during installation and thus makes installation possible with very little installation force.

In the removal direction, however, the locking shoulder of the valve shaft projection and the latching ramp rising in the removal direction together form an obstacle to axial movement, a removal force significantly greater than the installation force having to be applied in order to move the locking shoulder of the valve shaft projection past the dome projection.

Preferably, the valve shaft portion is realized as a sealing portion for receiving radial sealing elements of a sealing means for sealing the valve shaft against the housing dome, the housing dome thus having a constant inner diameter across the height of the dome projection with the exception of the area in which the dome projection is formed, which further simplifies production of the armature housing in the injection molding process.

If the outer diameter of the valve shaft projection corresponds to the outer diameter of the valve shaft portion, the valve shaft projection can simultaneously function as a surge collar disposed upstream of the sealing means, making it possible for the volume forces of the liquid flowing out of the armature housing which act on the seals in the sealing portion to be dampened in terms of their effect on the sealing means.

Adjacent to the dome projection, the valve shaft portion particularly advantageously has a supporting collar for resting on the locking ramp of the dome projection in a supporting manner, the locking ramp of the dome projection thus simultaneously serving as an axial abutment for the valve shaft.

If the supporting collar and the locking protrusion additionally have corresponding cross-sectional contours, the dome projection and the supporting collar together form an axial sliding bearing for comfortable operation of the tapping armature.

Hereinafter, a preferred embodiment of the tapping armature will be explained in more detail with reference to the drawings.

Figure 1:
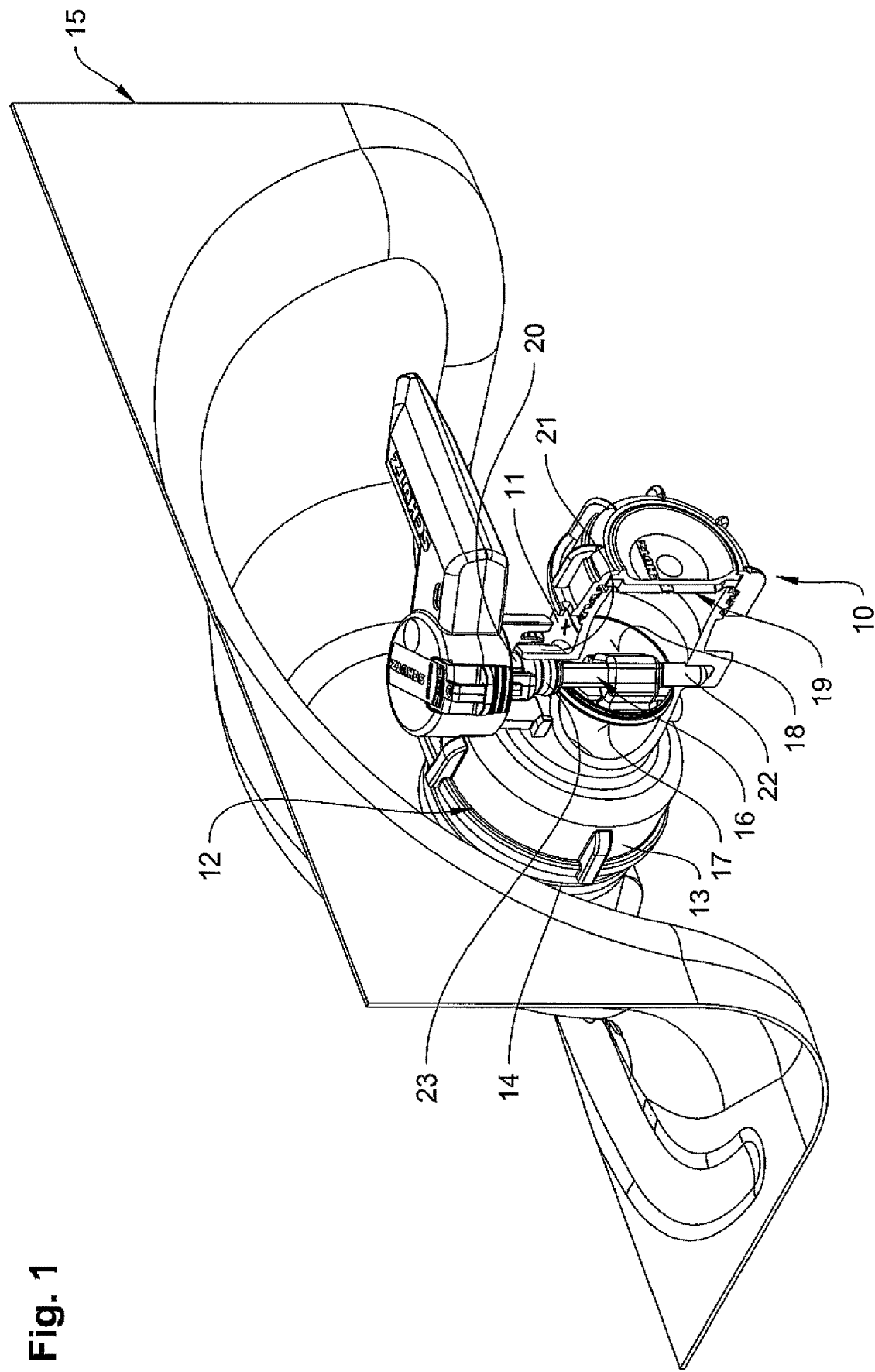
FIG. 1 is an isometric illustration of a tapping armature connected to a transport and storage container for liquids with a valve shaft guided in a housing dome of an armature housing.

FIG. 1 shows a tapping armature 10 having an armature housing 11, an inlet end 12 of armature housing 11 being connected to an outlet port 14 by means of a cap nut 13, outlet port 14 being disposed on a liquid container 15 of which only the armature connection portion is illustrated in FIG. 1. Liquid containers 15 of the kind illustrated in FIG. 1 are produced by blow molding, for example, and form a part of an intermediate bulk container (IBC), where they are disposed in a cage disposed on a pallet.

FIG. 1 shows tapping armature 10 in its closed position, in which a valve body 17 disposed on a valve shaft 16 blocks a flow cross section of an outlet tube 19 formed by armature housing 11. In the embodiment example illustrated here, valve body 17 is connected to a connection end 22 of valve shaft 16 via a shaft-hub connection 18. An operating end 20 of valve shaft 16 protrudes from armature housing 11 through a housing dome 21 formed on armature housing 11, and a valve shaft portion 23 of valve shaft 16 is housed in housing dome 21.

Figure 2:
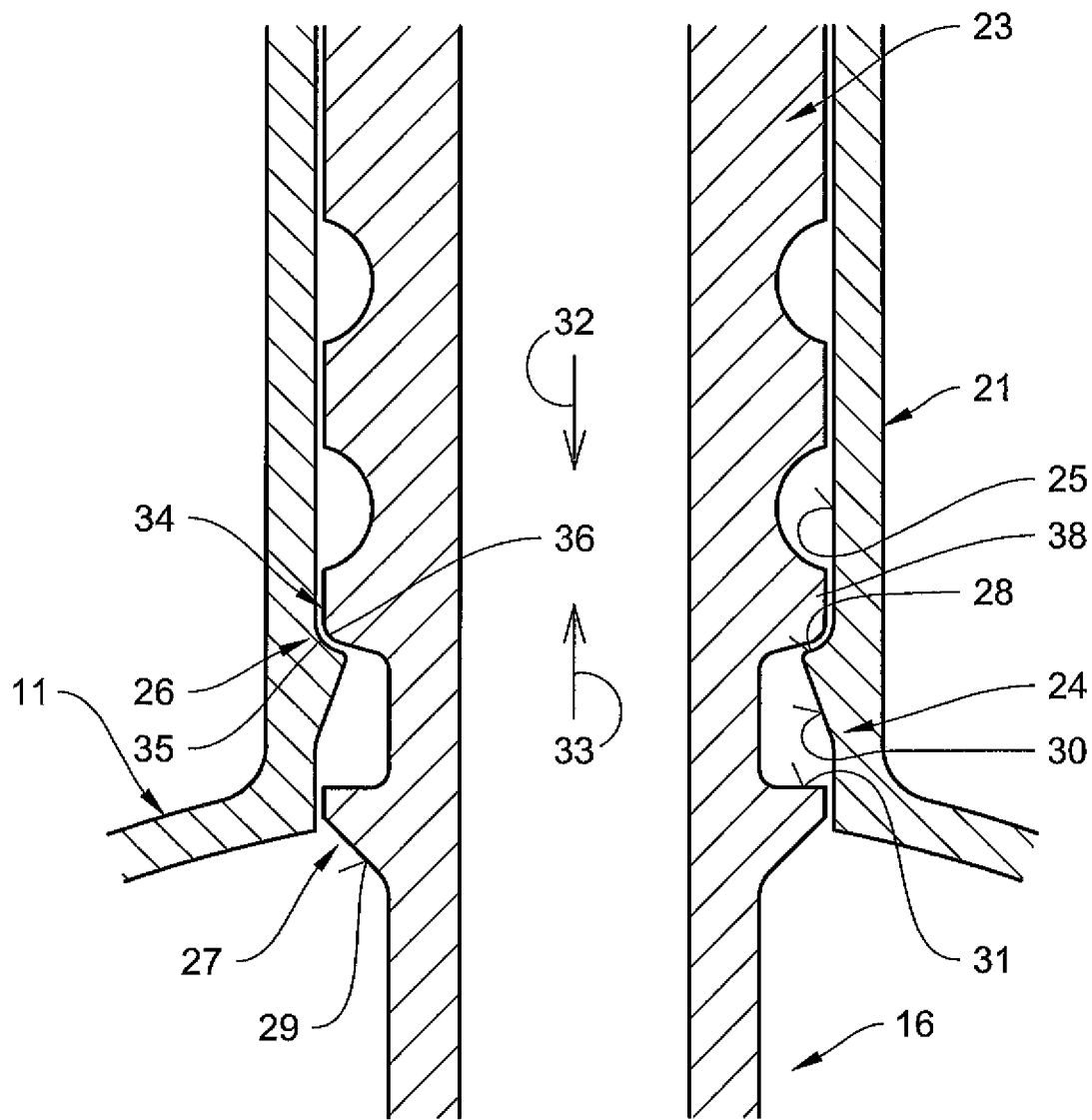
FIG. 2 shows a valve shaft portion mounted in the housing dome of the armature housing.

As can be seen in FIG. 2 in particular, an engagement means 24 is formed between housing dome 21 and valve shaft portion 23 formed in the area of transition between connection end 22 and operating end 20, engagement means 24 having a radial dome projection 26 which is formed in a passage opening 25 of housing dome 21 and which is realized as a ring web in the embodiment example at hand. A radial valve shaft projection 27 is formed on valve shaft portion 23. As can be gathered from FIG. 2, valve shaft projection 27 and dome projection 26 together form an axially acting locking mechanism when valve shaft 16 is installed in armature housing 11, for which purpose valve shaft 16 is introduced into housing dome 21 from above in the installation direction 32.

Both dome projection 26 and valve shaft projection 27 are ramp-shaped; when viewed in installation direction 32, dome projection 26 first has a relatively short, steeply rising locking ramp 28, past which valve shaft projection 27 is guided during installation, causing valve shaft projection 27 to lock behind dome projection 26 once a locking ramp 29 which is formed on valve shaft projection 27 and descends in the installation direction has slid past dome projection 26.

In contrast to the relatively low pressing force necessary during installation for reaching the configuration illustrated in FIG. 2, in which valve shaft projection 27 is locked behind dome projection 26, a pulling force which is significantly greater than the pressing force is necessary for severing the locked connection between valve shaft 16 and housing dome 21 of armature housing 11 owing to a latching ramp 30 of dome projection 26 rising in removal direction 33 and a locking shoulder 31 formed on valve shaft projection 27.

This ensures that a separation of valve shaft 16 from armature housing 11 can only ever be the result of an intentional removal process and cannot occur during a normal opening process of the valve. By contrast, only a relatively low pressing or joining force is required owing to the inverse rising directions of locking ramp 28 of dome projection 26 and locking ramp 29 of valve shaft projection 27, which allow locking ramps 28, 29 to slide on each other when establishing the connection between valve shaft 16 and dome projection 26.

As further shown in FIG. 2, adjacent to dome projection 26, valve shaft portion 23 has a supporting collar 34 for resting on locking ramp 28 of dome projection 26 in a supporting manner, locking ramp 28 and supporting collar 34 having corresponding cross-sectional contours 35, 36.

Figure 3:
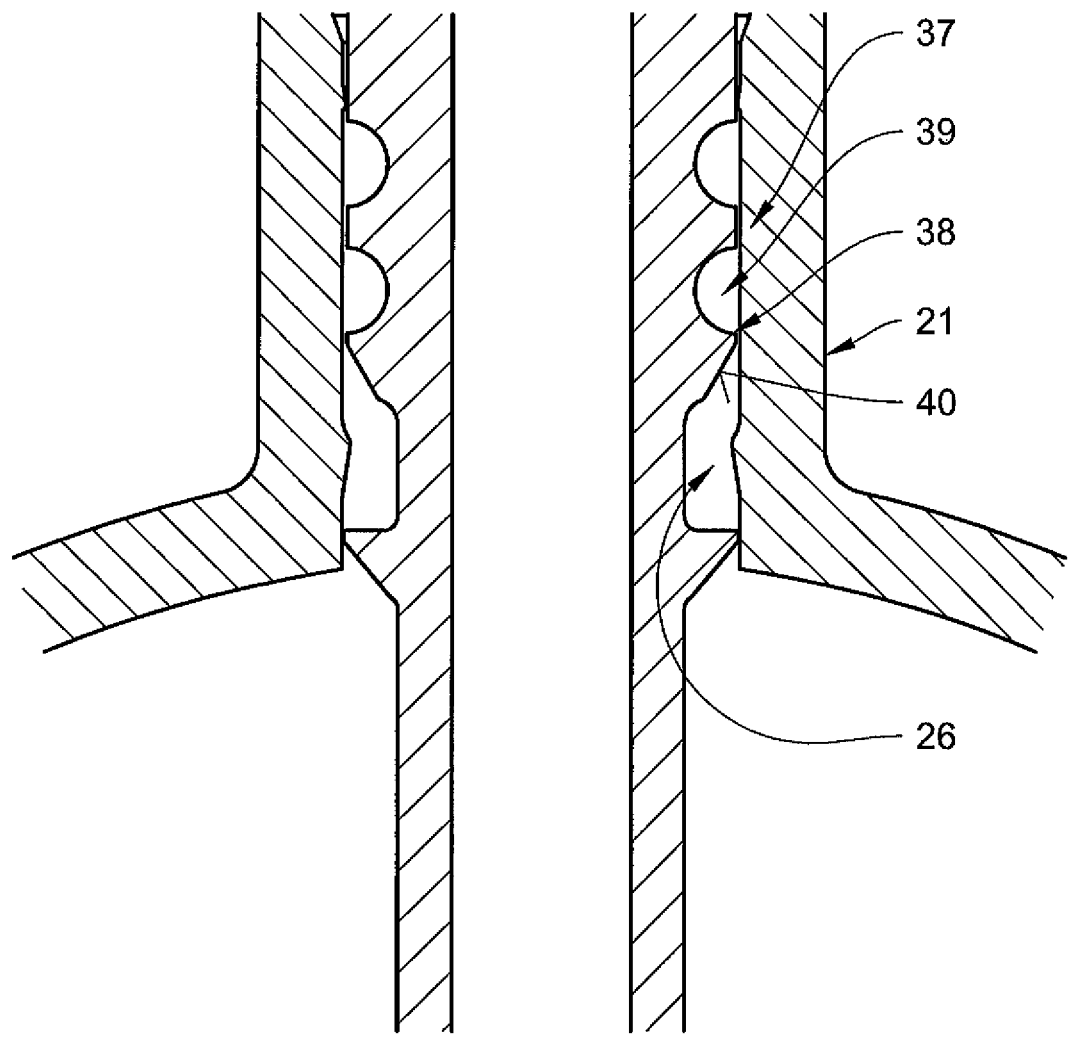
FIG. 3 shows another embodiment of the valve shaft portion.
Figure 4:
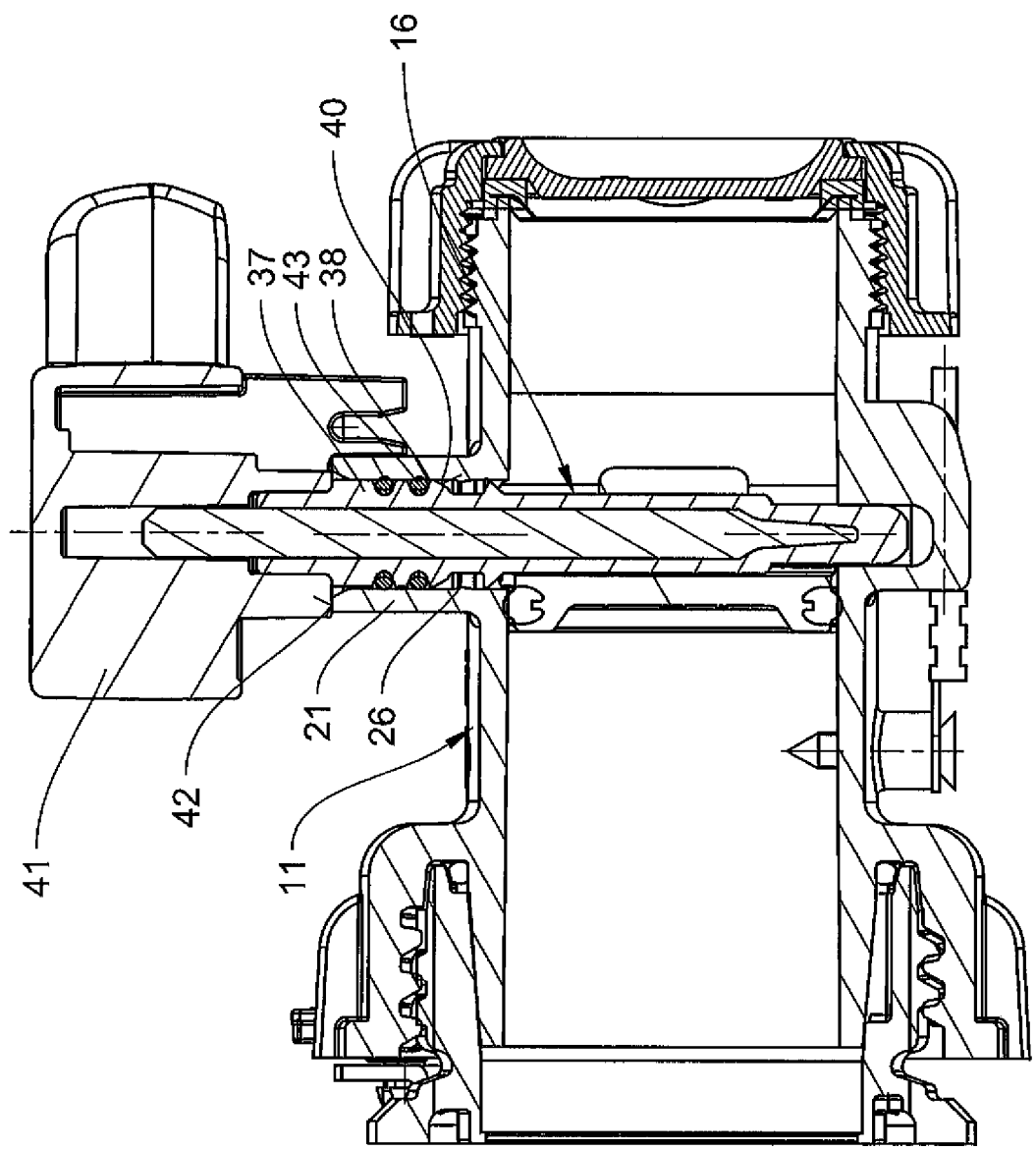
FIG. 4 is a longitudinal-section view of a tapping armature with the valve shaft portion mounted in the housing dome of the armature housing.

In another embodiment, FIG. 3 shows a valve shaft portion 37 which differs from valve shaft portion 23 in that it does not have a supporting collar which is formed on a groove flank 38 of a receiving groove 39 designed to receive a radial sealing element 43 and which has a cross-sectional contour 36 matching cross-sectional contour 35 of dome projection 26, but a chamfer 40 disposed on groove flank 38 opposite dome projection 26. This ensures that valve shaft 16 is axially supported as illustrated in FIG. 4 by a handle 40, which is connected to valve shaft 16, coming into contact with an upper edge 42 of housing dome 21 only, and that a physical contact between groove flank 38 and dome projection 26 is precluded. This ensures that groove flank 38 cannot undesirably damage dome projection 26 if valve shaft 16 is pressed too far into housing dome 21 during installation, which could lead to the desired great pulling forces not being achieved.

The invention claimed is:

1. A tapping armature for liquid containers for being connected to an outlet port or an outlet opening of a transport and storage container for liquids, the tapping armature comprising:
   an armature housing;
   an outlet tube disposed in the armature housing;
   a valve body pivotable by means of a valve shaft and serving to open and close a flow cross section of the outlet tube is disposed in the armature housing, a connection end of the valve shaft for being connected to the valve body being disposed in the outlet tube of the armature housing and an operating end of the valve shaft protruding from the armature housing through a housing dome formed on the armature housing,
   wherein a form-fitting engagement is established between the housing dome and a valve shaft portion housed in the housing dome in order to axially secure the valve shaft in the armature housing, and wherein an engagement means is realized for establishing the form-fitting engagement, the engagement means having a radial dome projection formed in a passage opening of the housing dome, which serves for the passage of the valve shaft portion, the radial dome projection forming an axial locking mechanism together with a radial valve shaft projection of the valve shaft portion, via direct physical contact between the radial dome projection and the radial valve shaft projection, wherein the axial locking mechanism is independent of a sealing portion of the valve shaft.

2. The tapping armature according to claim 1, wherein the radial dome projection is formed at an axially lower end of the passage opening in the housing dome.

3. The tapping armature according to claim 1, wherein the radial dome projection is ramp-shaped and has a relatively short locking ramp steeply rising in an installation direction of the valve shaft and a relatively long and flat latching ramp descending in the installation direction of the valve shaft.

4. The tapping armature according to claim 3, wherein the radial valve shaft projection is also ramp-shaped and has a locking ramp descending in the installation direction and a locking shoulder formed at an end of the locking ramp.

5. The tapping armature according to claim 1, wherein the valve shaft portion is realized as a sealing portion for receiving radial sealing elements for sealing the valve shaft against the housing dome.

6. The tapping armature according to claim 5, wherein an outer diameter of the valve shaft projection corresponds to an outer diameter of the valve shaft portion.

7. The tapping armature according to claim 1, wherein adjacent to the radial dome projection, the valve shaft portion has a supporting collar for resting on a locking ramp of the radial dome projection in a supporting manner.

8. The tapping armature according to claim 7, wherein the supporting collar and the valve shaft projection have corresponding cross-sectional contours.

\* \* \* \* \*

UNITED STATES PATENT AND TRADEMARK OFFICE
CERTIFICATE OF CORRECTION

PATENT NO. : 12,180,060 B2
APPLICATION NO. : 17/618671
DATED : December 31, 2024
INVENTOR(S) : Sebastian Schneider et al.

Page 1 of 1

It is certified that error appears in the above-identified patent and that said Letters Patent is hereby corrected as shown below:

In the Claims

Claim 1, Column 4, Line 47 "tube is disposed" should be --tube disposed--.

Signed and Sealed this
Eighth Day of April, 2025

Coke Morgan Stewart
*Acting Director of the United States Patent and Trademark Office*